United States Patent [19]

Hazelden

[11] Patent Number: 5,531,127
[45] Date of Patent: Jul. 2, 1996

[54] OPTICAL TORQUE SENSOR

[75] Inventor: Roger J. Hazelden, Worcestershire, England

[73] Assignee: Lucas Industries public limited company, West Midlands, England

[21] Appl. No.: 289,195

[22] Filed: Aug. 11, 1994

[30] Foreign Application Priority Data

Aug. 13, 1993 [GB] United Kingdom ............... 9316842

[51] Int. Cl.⁶ ........................................................ G01F 1/00
[52] U.S. Cl. ................................. 73/862.336; 73/862.334
[58] Field of Search ..................... 73/862.324, 862.325, 73/862.326, 862.327, 862.328, 862.329

[56] References Cited

U.S. PATENT DOCUMENTS

| | | | |
|---|---|---|---|
| 3,538,762 | 11/1970 | Perkinson et al. | 73/862.328 |
| 3,548,649 | 12/1970 | Parkinson | 73/862.329 |
| 3,587,305 | 6/1971 | Parkinson | 73/862.328 |
| 3,824,848 | 7/1974 | Parkinson | 73/862.328 |
| 4,433,585 | 2/1984 | Levine . | |
| 4,488,443 | 12/1984 | Parkinson | 73/862.329 |
| 4,561,515 | 12/1985 | Hashimoto et al. . | |
| 4,621,833 | 11/1986 | Soltis . | |
| 4,693,123 | 9/1987 | Bacardit . | |
| 4,798,253 | 1/1989 | Naito . | |
| 4,856,323 | 8/1989 | Morishita et al. . | |
| 4,882,693 | 11/1989 | Yopp . | |
| 5,031,455 | 7/1991 | Cline | 73/862.28 |
| 5,065,324 | 11/1991 | Oshita et al. . | |
| 5,182,953 | 2/1993 | Ellinger et al. . | |
| 5,369,583 | 11/1994 | Hazelden | 364/424.05 |

FOREIGN PATENT DOCUMENTS

| | | | |
|---|---|---|---|
| 0065786A | 12/1982 | European Pat. Off. | B60G 17/00 |
| 0340172A | 4/1989 | European Pat. Off. | G01L 3/12 |
| 2118722 | 11/1972 | Germany | G01L 3/10 |
| 417051 | 9/1934 | United Kingdom | G01L 3/12 |
| 1233916 | 6/1971 | United Kingdom | G01L 3/12 |

Primary Examiner—Richard Chilcot
Assistant Examiner—Ronald Biegel
Attorney, Agent, or Firm—Christensen O'Connor Johnson & Kindness

[57] ABSTRACT

An improved torque sensor, or relative angular movement sensor, comprises an input member, an output member, LED light sources, a pair of photodetector units adapted to receive light from the LED light sources, and a signal processor, in which said signal processor is adapted to receive output signals from the photodetector units, the output signals of the photodetector units being dependent upon the light signals which they receive, and the signal processor being adapted to process the output signals from the photodetector units so as to produce a modified output signal indicative of the relative angular displacement between, or torque applied between, the input and output member, wherein the improvement lies in the arrangement of photodetectors which comprise the photodetector units. The photodetectors are arranged in such a way that any phase shift which may exist between the signals from the two photodetector units is cancelled out when the modified torque output signal is produced, in order to remove any 'ripple' in this signal.

11 Claims, 5 Drawing Sheets

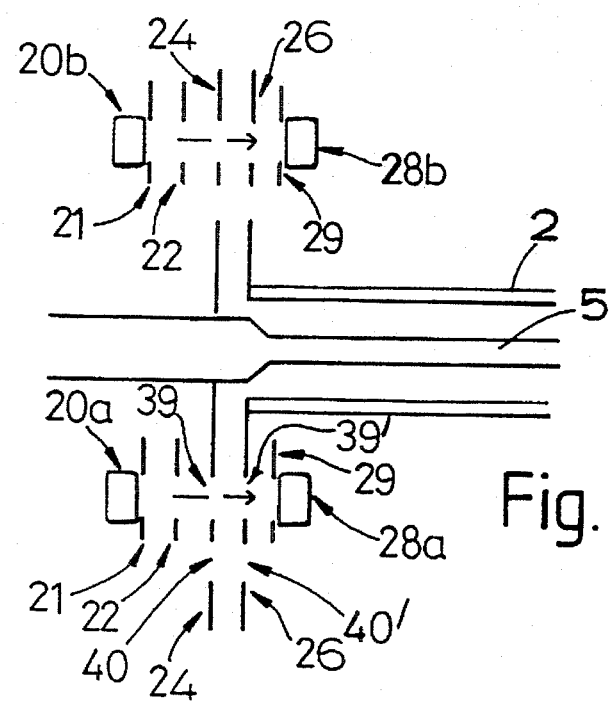
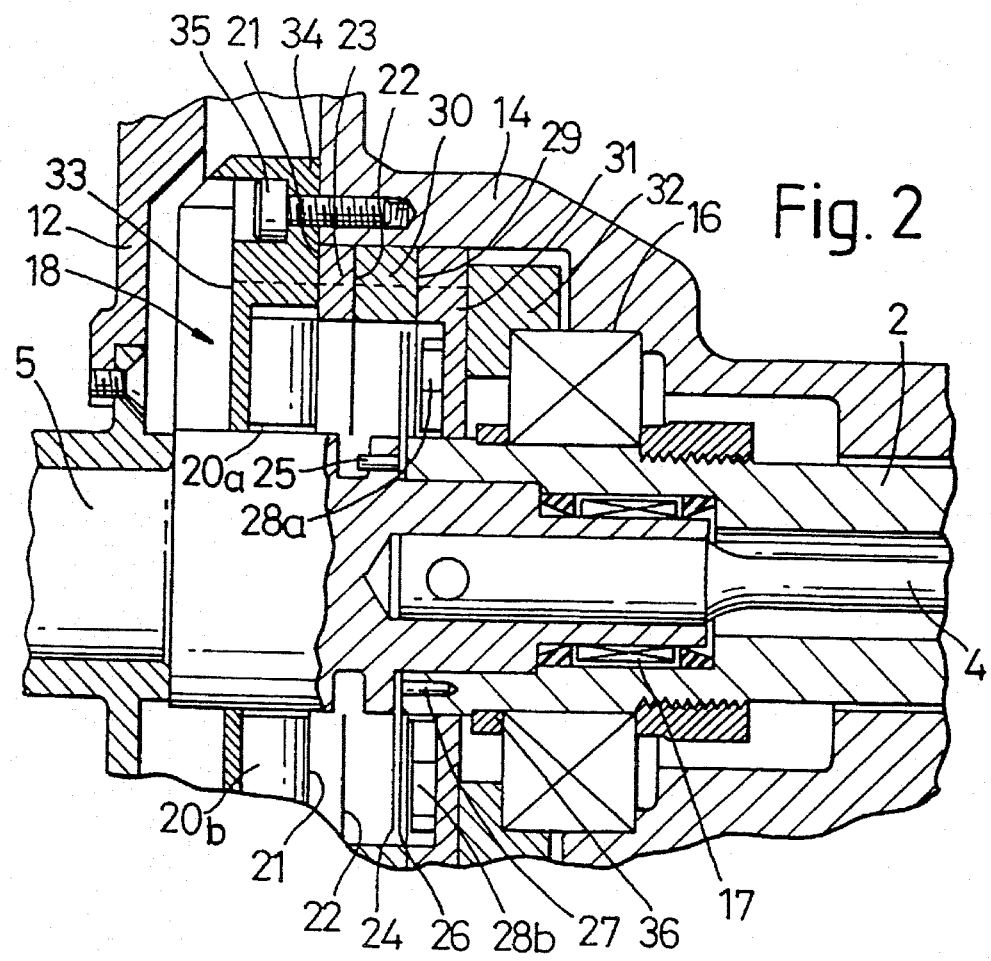

OPTICAL TORQUE SENSOR

BACKGROUND OF THE INVENTION

This invention relates to improved optical torque sensors especially, but not exclusively, for incorporation in power-assisted steering systems for vehicles.

In our European patent application No. 93300792.4, a torque sensor is described which comprises an input member, an output member, emitter means, first receiver means adapted to receive a first signal, second receiver means adapted to receive a second signal, and signal processing means, in which said signal processing means is adapted to receive output signals from the first and second receiver means, the output signals of the receiver means being dependent upon the first and second signals which they receive, and the signal processing means being adapted to process the output signals from the first and second receiver means so as to produce a modified output signal indicative of the relative angular displacement between, or torque applied between, the input and output member.

In a described embodiment of the invention input and output masks are associated with the input and output members respectively, interposed between the emitter means and the first and second receiver means. In this embodiment each of the input and output masks comprises an outer arc of angularly spaced apertures and a radially spaced inner arc of angularly spaced apertures, and preferably the inner and outer arcs of the apertures extend around a complete circle, forming an inner track of apertures and an outer track of apertures. The input and output masks move angularly with the input and output members respectively and are both centred on their common axis of rotational symmetry. The first and second receiver means receive signals through the superimposed inner and outer tracks of apertures respectively, and may each comprise first and second effective receivers respectively.

However, in a torque sensor of this construction, with one or more effective receivers for each track, a problem may be encountered if the two rotating masks are not accurately concentric. Errors in the concentricity of the masks can give rise to a variation in the torque output of the sensor as the input member is rotated at a given torque, the period of the variation being equal to one revolution of the input member. This variation, or "low-frequency ripple" can cause difficulty in determining the zero position of the sensor, since even quite small alignment errors can cause variations of 10% in the sensor output.

The ripple occurs due to periodic variations in the signals from both the inner and outer track receiver means, these variations being out of phase by an amount dependent on the phase relationship between the apertures of the two tracks. Where the two signals are out of phase, the fluctuation is not cancelled out when the torque is calculated, thus a ripple results in the calculated torque signal.

An aim of the present invention is to provide an improved torque sensor which incorporates means to prevent any ripple from being present in the torque signal.

SUMMARY OF THE INVENTION

According to a first aspect, the invention comprises a torque sensor comprising:

an input member;

an output member;

electromagnetic wave emitter means;

first electromagnetic wave receiver means for receiving a first signal, the first receiver means comprising means to output at least one output signal dependent upon the first signal;

second electromagnetic wave receiver means for receiving a second signal, the second receiver means comprising means to output at least one output signal dependent upon the first signal;

signal processing means for processing the output signals from the first and second receiver means to produce a modified output signal indicative of the relative angular displacement between, or torque applied between, the input and output members, and input and output masks, the input and output masks being associated with the input and output members respectively and being interposed between the emitter means and the first and second receiver means, the input and output masks each comprising an outer track containing an angularly spaced set of apertures and a radially spaced inner track containing an angularly spaced set of apertures, and the masks having equal aperture pitch, the aperture pitch of each mask being defined as the total angle subtended at a central axis of the respective mask by one opaque and one transparent region of the mask, wherein:

the first receiver means comprises a pair of first and second effective receivers disposed so as to receive signals from the inner tracks of apertures;

the second receiver means comprises a pair of first and second effective receivers disposed so as to receive signals from the outer tracks of apertures;

each of the effective receivers comprises means to output a signal dependent upon the respective signal received, and the pair of effective receivers of the first receiver means is diametrically opposed to the pair of effective receivers of the second receiver means, in relation to the tracks of apertures of at least one of the masks.

This arrangement removes the phase shift between the total inner and outer track receiver output signals and cancels the ripple in the calculated torque signal when the amplitude of the periodic variation in the sum of the outer track effective receiver signals is of similar amplitude to the amplitude of the periodic variation in the sum of the inner track effective receiver signals. This is the case at around zero applied torque. Each aperture preferably subtends substantially half an aperture pitch at the central axis of the respective mask.

The emitter means may comprise two pairs of effective emitters positioned diametrically opposite to each other with respect to the outer and inner tracks of apertures of at least one of the masks, with one pair of effective emitters being associated with the outer aperture track of one of the masks and the other pair of effective emitters being associated with the inner aperture track of one of the masks.

Preferably the two pairs of effective emitters are associated respectively with the outer and inner aperture tracks of the same one of the input and output masks.

Preferably the emitter means comprises four pairs of effective emitters, a first two pairs of which are diametrically opposed to each other with respect to the tracks of apertures of at least one of the masks, and a second two pairs of which are diametrically opposed to each other with respect to the tracks of apertures of at least the same one of the masks, the first two pairs being associated with the outer aperture track of one of the masks and the second two pairs being associated with the inner aperture track of one of the masks.

Preferably the first and second two pairs of effective emitters are associated respectively with the outer and inner aperture tracks of the same one of the masks.

Preferably one pair of the first two pairs of effective emitters is diametrically opposed to one pair of the second two pairs of effective emitters and the other pair of the first two pairs of effective emitters is diametrically opposed to the other pair of the second two pairs of effective emitters.

Preferably the first receiver means comprises two pairs of first and second effective receivers which are positioned diametrically opposite each other in relation to the tracks of apertures of at least one of the masks, all four effective receivers receiving signals from the inner aperture tracks and arranged such that each one of the effective receivers of one pair is diametrically opposed to a respective one of the effective receivers of the other pair. Preferably the second receiver means comprises two pairs of first and second effective receivers and these two pairs of effective receivers are diametrically opposed in relation to the tracks of apertures of at least the same one of the masks, all four effective receivers receiving signals from the outer aperture tracks and arranged such that each one of the effective receivers of one pair is diametrically opposed to a respective one of the effective receivers of the other pair.

Preferably the resultant eight effective receiver signals may be combined in pairs to produce four outputs for the first and second receiver means, as in the arrangement described having only four effective receivers.

Preferably any torque-dependent fluctuations due to concentricity errors are of equal and opposite magnitudes for the two effective receivers of each one of said pairs so that the fluctuations cancel out regardless of applied torque.

According to a second aspect the invention comprises a power-assisted steering system having an improved torque sensor according to the first aspect of the invention, an input column transmitting torque from a steering wheel to the input member of the torque sensor, and an output column transferring torque to a steering mechanism adapted to steer road wheels of the system.

DETAILED DESCRIPTION OF THE DRAWINGS

FIG. 1 shows schematically the principle behind an improved optical torque sensor for incorporation in a power-assisted steering system for a vehicle;

FIG. 2 is a schematic view of a power-assisted steering system for a vehicle;

Figure 3:
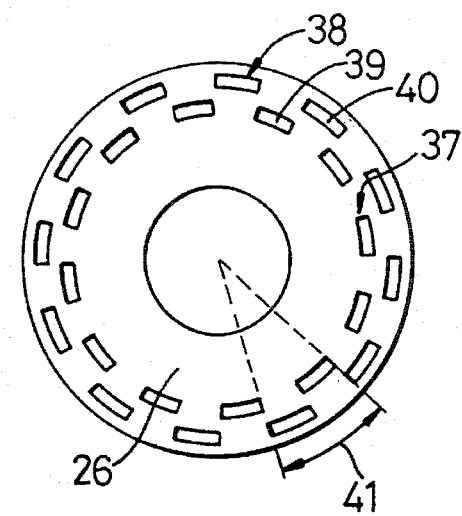
FIGS. 3 and 4 show respectively, input and output discs which comprise parts of the improved torque sensor of FIG. 1.

DESCRIPTION OF THE PREFERRED EMBODIMENTS.

Embodiments of the invention will now be described by way of example only with reference to the accompanying drawings.

An improved optical torque sensor for incorporation in a power-assisted steering system for a vehicle is shown schematically in FIG. 1 and is shown incorporated in a power-assisted steering system for a vehicle in FIG. 2. The power-assisted steering system comprises a steering input shaft 2 coupled at one end to a steering wheel and at the other end to a torsion bar 4 which transmits steering torque to a steering output shaft 5. Input torque is applied to the input shaft 2 which moves angularly relative to the output shaft 5, due to the torsion bar twisting under the applied torque differential. The optical torque sensor 18 detects the relative angular movement between the input and output shafts and sends a signal indicative of the relative displacement to a control microprocessor. The microprocessor controls a motor so as to apply torque to the output shaft 5 in a sense such as to reduce the relative angular displacement between the input and output shafts. In addition the torque sensor can also be used to obtain the rate of rotation of the steering shaft 5 and the angular displacement of the steering shaft 5.

The torque sensor, as shown schematically in FIG. 1 and FIG. 2, comprises two light source units 20a and 20b, each comprising two LEDs, fixed relative to a housing 14; a pair of source collimator plates 21 and 22 associated with the light sources and also fixed relative to the housing 14; an annular spacer 23 provided between the source collimator plates 21 and 22; an output disc or mask 24 rigidly attached to the output shaft 5 by studs 25; an input disc or mask 26 rigidly attached to the input shaft 2 by studs 27, a pair of light detector units 28a and 28b fixed relative to the housing 14; a detector collimator 29 associated with the detectors units 28 and also fixed relative to the housing 14; an annular spacer 30 interposed between the detector collimator 29 and the source collimator 22; a detector-mounting dish member 31 upon which the detector units 28 are mounted; a packing member 32 provided between the mounting member 31 and the adjacent bearing 16; and an LED-mounting dish member 33 upon which the light source units 20a and 20b are mounted diametrically opposite to each other, the dish member 33 having lugs 34 by means of which it is clamped via screws 35 to the housing 14. A circlip 36 holds the bearing 16 in place.

FIG. 3 shows a known arrangement of the input mask 26. The mask 26 is an annular disc having inner and outer rings 37 and 38 of circumferentially elongate apertures 39 and 40. The apertures 39 and 40 are equi-angularly spaced and have an angular pitch referenced 41. Each aperture subtends half a pitch at the central axis of the disc. The two rings 37 and 38 are angularly offset in antiphase with each other so that the apertures 39 of the inner ring are at the same angular positions as the opaque, blocking, regions of the outer ring.

Figure 4:
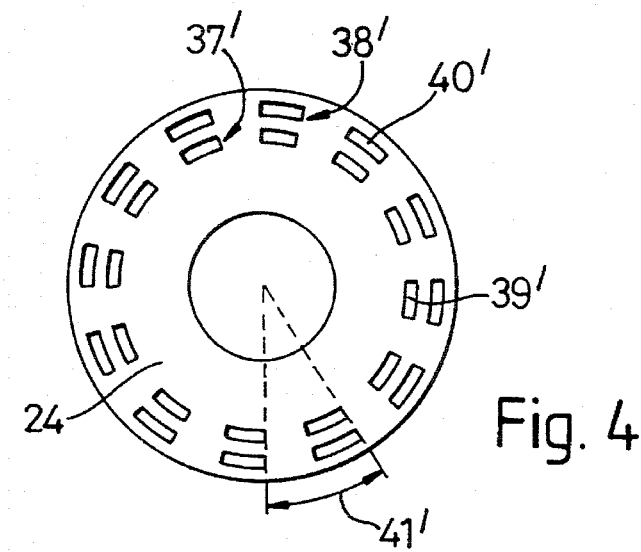

FIG. 4 shows the arrangement of the output mask 24 which is similar to that of the input mask 26 except that the apertures of the inner and outer rings are not offset, they are in phase with each other. The rings 38 and 38', and 39 and 39' are superimposed upon each other, as illustrated schematically in FIG. 1.

Figure 5:
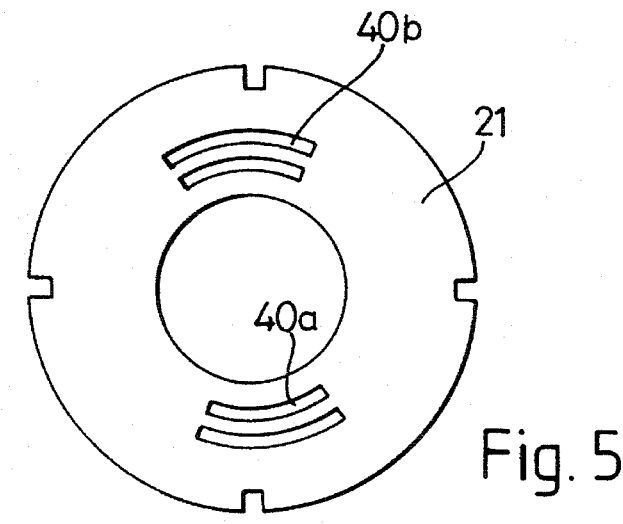
FIG. 5 shows a collimator.

FIG. 5 shows the light source collimator 21 which comprises a plate having a diametrically opposed pair of inner and outer collimating apertures 40a and 40b. One of the two outer collimator apertures 40b registers with light source unit 20b and the diametrically opposite one of the inner collimating apertures 40a registers with the light source unit 20a. The collimator plate has notches in its outer periphery which assist in locating the collimator relative to the member 33.

The detector collimator 29 is substantially the same as the source collimator, and the apertures 40a and 40b of each of the collimating plates are aligned. The collimator apertures 40a and 40b are arranged to have radial dimensions similar to those of the apertures 39, 39', 40, 40' in the rotating masks 24, 26 but the circumferential dimension of the collimator apertures is an integral multiple of the aperture pitch on the rotating masks 24, 26.

Figure 6A:
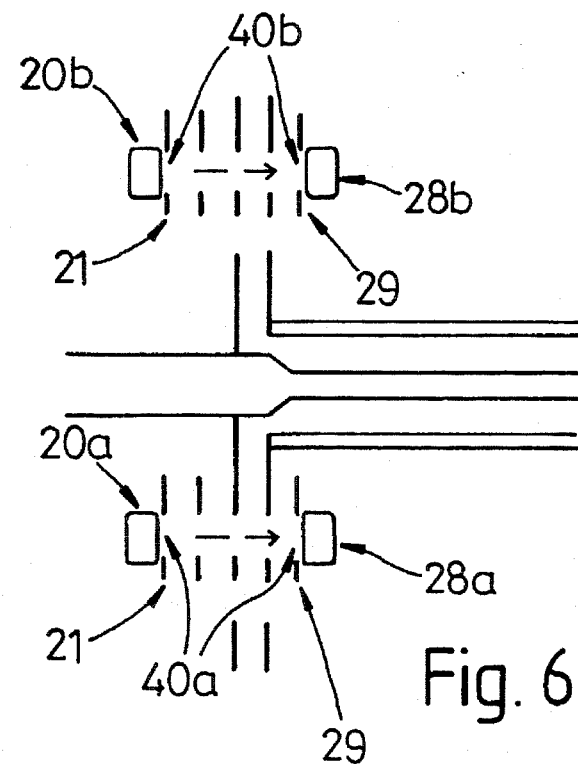
FIG. 6a shows schematically the improved optical torque sensor.
Figure 6B:
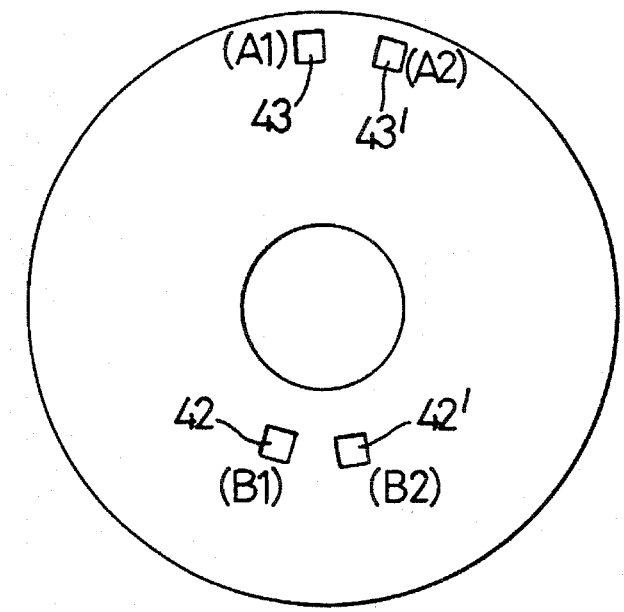
FIG. 6b shows an arrangement of first and second detectors of both of first and second detector units of the improved torque sensor.

The detector units 28a and 28b, shown schematically in FIG. 6a, are arranged to give an equal signal when there is no torque differential applied between the input and output shafts. Each detector unit 28a and 28b comprises a pair of photodiode detectors 42, 42' and 43, 43' respectively, the two pairs of detectors being diametrically opposed on the detector-mounting dish member 31 as shown in FIG. 6b. As shown in FIG. 6a, the detectors 42, 42' receive signals via the inner aperture track, from the respective two LEDs of light source unit 20a, and the detectors 43, 43' receive signals via the outer aperture track, from the respective two LEDs of light source unit 20b.

The signals from the four detectors 42, 42', 43 and 43' are fed to a control microprocessor which operates on them to produce an modified output signal indicative of the torque applied between the input and output shaft. Signals A1 and A2 from the outer track detectors 43, 43' are summed by the microprocessor to produce the sum signal A. Signals B1 and B2 from the inner track detectors 42, 42' are summed by the microprocessor to produce the sum signal B. The microprocessor subtracts the signal B from the signal A and divides the result by the sum of signals A and B to produce a modified output signal related to the torque, T, by the expression:

$$\text{Modified torque signal, } T = K \times \frac{A-B}{A+B}$$

where K is a constant.
This gives a value of +K for a full scale clockwise rotation (outer signal at maximum and inner signal at zero), and a value of −K for a full scale anticlockwise rotation (outer signal at zero, inner signal at maximum), and a value of zero when the applied torque is zero (outer signal equals inner signal).

Figure 7A:
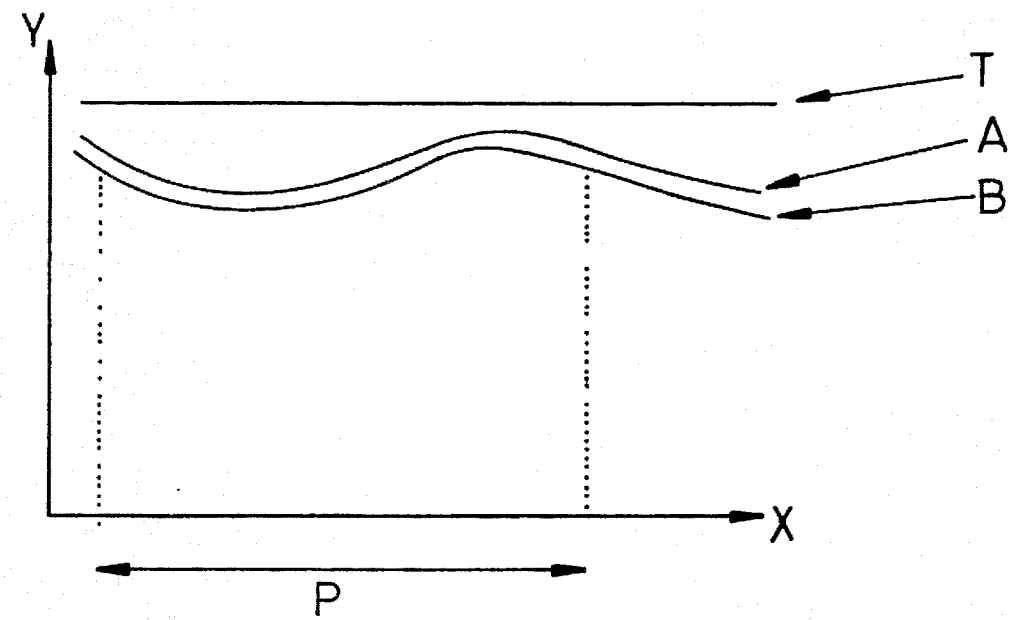
FIG. 7a is a graph illustrating cancellation of torque signal ripple resulting from using the arrangement of FIG. 6.

If the two discs 24, 26 are not accurately concentric then a periodic variation, or low-frequency ripple, will be present in signal A, the total outer-track signal, as the steering shaft is rotated. This signal ripple is illustrated in FIG. 7a where Y, representing "signal strength" is plotted against X, representing "rotation of the shaft". Similarly, a periodic variation or ripple is present in the signal B, the total inner track signal, as the steering shaft is rotated. The period P of both ripple signals is equal to one revolution of the steering shaft. However, due to the described arrangement of the detectors, and the phase relationship between the apertures on the inner and outer tracks of the discs 24 and 26, the periodic variations in the two signals A and B are in phase. Therefore, when the modified torque signal, T, is calculated the ripples in the two signals A and B cancel out provided that the two signals are equal ripple amplitude.

Figure 7B:
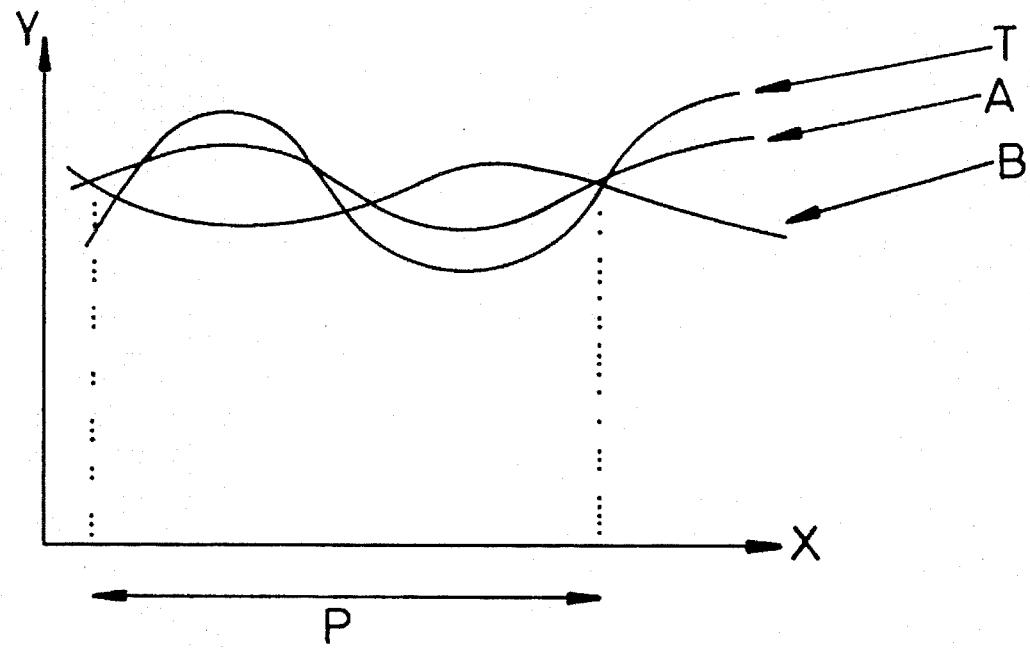
FIG. 7b is a graph illustrating signal ripple on a torque signal during one revolution of an input shaft.

FIG. 7b, also a plot of "signal strength" (Y-axis) against "rotation of the shaft" (X-axis), illustrates how the ripple on the signals A and B can lead to a resultant ripple in the torque signal, if the two pairs of detectors 42, 42' and 43, 43' respectively, are not arranged diametrically opposite to each other.

Figure 8A:
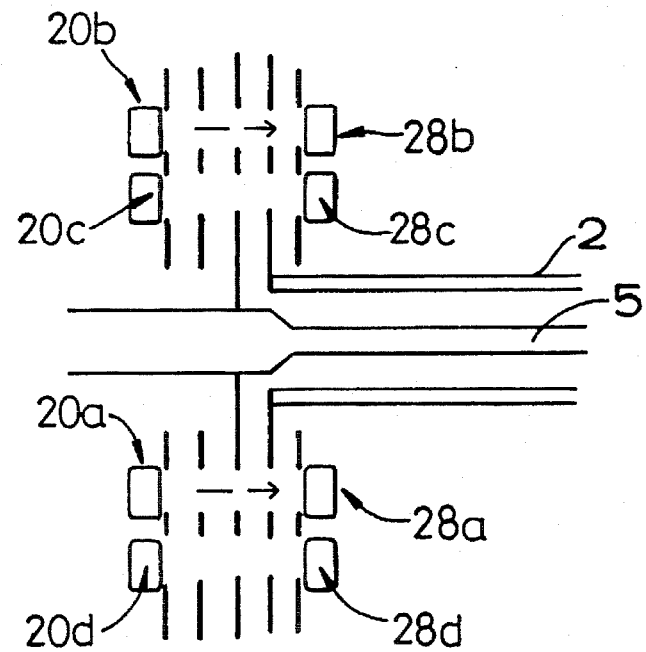
FIG. 8a shows schematically an improved arrangement of emitters and detectors in the improved torque sensor.
Figure 8B:
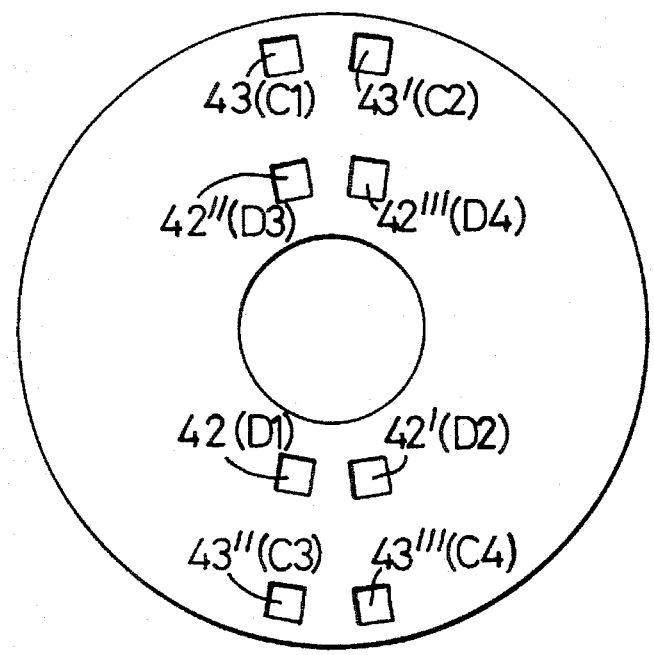
FIG. 8b shows an improved arrangement detectors of the improved torque sensor.

However, the detector arrangement of FIG. 7a only works successfully to cancel ripple appearing in the torque signal when the outer and inner track signal fluctuations are of similar amplitude, in other words, around zero torque. As the torque increases in either direction, the ripple amplitude increases, since the amplitude of the fluctuations is no longer equal. To avoid this, a further improvement can be made by doubling the number of photodiode detectors and doubling the number of LEDs, and using two pairs of detectors, diametrically opposed, per track and two pairs of LEDs diametrically opposed, per track. FIG. 8b shows the detector arrangement (viewed in a direction along the steering shaft) used in this arrangement. Detectors 43, 43' and 43", 43"' comprise the two outer track pairs of detectors, with respective signal outputs C1, C2 and C3, C4. Detectors 42, 42' and 42", 42"' comprise the two inner track pairs of detectors, with respective signal outputs D1, D2 and D3, D4. Light source units 20a, 20b, 20c and 20d, shown schematically in FIG. 8a, comprise the four pairs of LEDs. Detector units 28b and 28d comprise the pair of detectors 43, 43' and 43", 43"' respectively and detector units 28a and 28c comprise the pairs of detectors 42, 42' and 42", 42"' respectively. Light source units 20b and 20d are diametrically opposed and comprise the two pairs of outer track LEDs. Light source units 20a and 20c are diametrically opposed and comprise the two pairs of inner track LEDs. Detectors 42, 42' and 42", 42"' receive signals from the respective LEDs of light source units 20a and 20c and detectors 43, 43' and 43", 43"' receive signals from the respective LEDs of light source units 20b and 20d.

The outputs from corresponding diametrically opposed detectors are summed, to give four outputs A1, A2, B1, B2 as before. Each output is comprised of the sum of the outputs of two diametrically opposed detectors such that:

C1+C4=A1
C2+C3=A2
D1+D4=B1
D2+D3=B2

Any torque-dependent fluctuations due to shaft concentricity errors should be of equal and opposite magnitude for the two detectors of a pair, therefore the fluctuations should substantially cancel out regardless of the torque. Therefore this detector arrangement effectively prevents any ripple from appearing in the modified torque signal output from the optical torque sensor.

I claim:

1. A torque sensor comprising:

an input member;

an output member;

electromagnetic wave emitter means;

first electromagnetic wave receiver means for receiving a first signal, the first receiver means comprising means to output at least one output signal dependent upon the first signal;

second electromagnetic wave receiver means for receiving a second signal;

the second receiver means comprising means to output at least one output signal dependent upon the second signal;

signal processing means for processing the output signals from the first and second receiver means to produce a modified output signal indicative of the angular displacement between, or torque applied between, the input and output members, and input and output masks, the input and output masks being associated with the input and output members respectively and being interposed between the emitter means and the first and second receiver means, the input and output masks each comprising an outer track containing an angularly spaced set of apertures and a radially spaced inner track containing an angularly spaced set of apertures, and the masks having equal aperture pitch, the aperture pitch of each mask being defined as the total angle subtended at a central axis of the respective mask by one opaque and one transparent region of the mask, wherein:

the first receiver means comprises a pair of first and second effective receivers disposed so as to receive signals from the inner tracks of apertures;

the second receiver means comprises a pair of third and fourth effective receivers disposed so as to receive signals from the outer tracks of apertures;

each of the effective receivers comprises means to output a signal dependent upon the respective signal received, and the pair of first and second effective receivers of the first receiver means is diametrically opposed to the pair of third and fourth effective receivers of the second receiver means, in relation to the tracks of apertures of at least one of the masks.

2. A torque sensor according to claim 1, in which each aperture subtends substantially one half of one aperture pitch at the central axis of the respective mask.

3. A torque sensor according to claim 2, in which the inner and outer tracks of apertures of one of the masks are in phase and the inner and outer tracks of apertures of the other mask are in antiphase.

4. A torque sensor according to claim 1 in which the signal processing means comprises means for summing the output signals from the pair of effective receivers of the first receiver means and means for summing the output signals from the pair of effective receivers of the second receiver means.

5. A torque sensor according to claim 1, in which the emitter means comprises two pairs of effective emitters positioned diametrically opposite each other in relation to the tracks of apertures of at least one of the masks, one pair of the effective emitters being associated with the outer aperture-containing track of one of the output and input masks, and the other pair of effective emitters being associated with the inner aperture-containing track of one of the input and output masks.

6. A torque sensor according to claim 5, in which the first and second receiver means are each associated with a respective one of the two pairs of effective emitters.

7. A torque sensor according to claim 1 wherein:

the first and second receiver means each comprise two pairs of first and second effective receivers, and two pairs of third and fourth effective receivers, respectively the first and second effective receivers of the first receiver means being disposed so as to receive signals from the inner tracks of apertures and the third and fourth effective receivers of the second receiver means being disposed so as to receive signals from the outer tracks of apertures;

each of the effective receivers comprises means to output a signal dependent upon the respective signal received;

one pair of effective receivers of the first receiver means is diametrically opposed to one pair of effective receivers of the second receiver means, in relation to the tracks of apertures of at least one of the masks, and the other pair of effective receivers of the first receiver means is diametrically opposed to the other pair of effective receivers of the second receiver means, in relation to the tracks of apertures of at least the same one of the masks;

each one of the effective receivers of one pair of the effective receivers of the first receiver means is diametrically opposed to a respective one of the effective receivers of the other pair of effective receivers of the first receiver means, in relation to the tracks of apertures of at least the same one of the masks, and each one of the effective receivers of one pair of the effective receivers of the second receiver means is diametrically opposed to a respective one of the effective receivers of the other pair of effective receivers of the second receiver means, in relation to the tracks of apertures of at least the same one of the masks.

8. A torque sensor according to claim 7 in which the emitter means comprises four pairs of effective emitters positioned such that a first two pairs of the four pairs are diametrically opposed to each other in relation to the tracks of apertures of at least one of the output and input masks, and a second two pairs of the four pairs are diametrically opposed to each other in relation to the tracks of apertures of at least the same one of the masks, the first two pairs of effective emitters being associated with the inner aperture track of one of the masks and the second two pairs of effective emitters being associated with the outer aperture track of one of the masks.

9. A torque sensor according to claim 8, in which one pair of the first two pairs of effective emitters is diametrically opposed to one pair of the second two pairs of effective emitters and the other pair of the first two pairs of effective emitters is diametrically opposed to the other pair of the second two pairs of effective emitters.

10. A torque sensor according to claim 7, in which the signal processing means comprises means for combining the output signals from the eight effective receivers in pairs to produce four resultant output signals for the first and second receiver means, two resultant output signals being comprised of the sum of the outputs of each two diametrically opposed effective receivers of the first receiver means and two resultant output signals being comprised of the sum of the outputs of each two diametrically opposed effective receivers of the second receiver means.

11. A power-assisted steering system having a torque sensor according to claim 1, an output column transmitting torque from a steering wheel to the input member of the torque sensor, and an output column transferring torque to a steering mechanism adapted to steer road wheels of the system.

* * * * *